(12) United States Patent
Motoki et al.

(10) Patent No.: US 8,520,361 B2
(45) Date of Patent: Aug. 27, 2013

(54) LAMINATED ELECTRONIC COMPONENT

(75) Inventors: Akihiro Motoki, Nagaokakyo (JP);
Syunsuke Takeuchi, Nagaokakyo (JP);
Makoto Ogawa, Nagaokakyo (JP);
Kenichi Kawasaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 152 days.

(21) Appl. No.: 13/045,585

(22) Filed: Mar. 11, 2011

(65) Prior Publication Data

US 2011/0236658 A1 Sep. 29, 2011

(30) Foreign Application Priority Data

Mar. 24, 2010 (JP) ................................. 2010-067492

(51) Int. Cl.
*H01G 4/228* (2006.01)
(52) U.S. Cl.
USPC ...................... 361/306.1; 361/303; 361/306.3; 361/301.4; 361/309; 361/305
(58) Field of Classification Search
USPC .................. 361/303, 306.3, 306.1, 301.4, 309
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 8,125,763 B2 * | 2/2012 | Kobayashi et al. | 361/309 |
| 8,254,081 B2 * | 8/2012 | Nishihara et al. | 361/300 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2009/0290280 A1 | 11/2009 | Takeuchi et al. | |

FOREIGN PATENT DOCUMENTS

| | | |
|---|---|---|
| JP | 63-169014 A | 7/1988 |
| JP | 2009-283597 A | 12/2009 |
| WO | 2007/049456 A1 | 5/2007 |

* cited by examiner

*Primary Examiner* — Nguyen T Ha
*Assistant Examiner* — Hung Dang
(74) *Attorney, Agent, or Firm* — Keating & Bennett, LLP

(57) ABSTRACT

A laminated electronic component includes a first plating film that defines a base for external terminal electrodes and that includes a plurality of layers including a first layer made of, for example, copper and a second layer provided on the first layer. The total thickness of the first plating film is about 3 μm to about 15 μm, and the thickness of the second layer is about 2 to 10 times as thick as the thickness of the first layer. The first layer is formed by electroless plating, and the second layer is formed by electrolytic plating. This formation results in a grain size of about 0.5 μm or more of a metal grain included in the second layer, and thus makes the film less susceptible to oxidation.

3 Claims, 1 Drawing Sheet

LAMINATED ELECTRONIC COMPONENT

BACKGROUND OF THE INVENTION

1. Field of the Invention

The present invention relates to a laminated electronic component, and more particularly, to a laminated electronic component which includes an external terminal electrode formed directly by plating so as to be electrically connected to an internal electrode.

2. Description of the Related Art

As shown in FIG. 2, a laminated electronic component 101 as typified by a laminated capacitor includes a laminate 105 including a plurality of stacked insulator layers 102 and a plurality of internal electrodes 103 and 104 formed along the interfaces between the insulator layers 102. The ends of the plurality of internal electrodes 103 and the ends of the plurality of internal electrodes 104 are respectively exposed at the end surfaces 106 and 107 of the laminate 105, and external terminal electrodes 108 and 109 are arranged so that the respective ends of the internal electrodes 103 and the respective ends of the internal electrodes 104 are electrically connected to each other.

For the formation of the external terminal electrodes 108 and 109, typically, a metal paste including a metal constituent and a glass constituent is applied onto the end surfaces 106 and 107 of the laminate 105, and then fired to form paste electrode layers 110. Next, first plating layers 111 including, for example, nickel as their main constituent are formed on the paste electrode layers 110, and second plating layers 112 including, for example, tin or gold as their main constituent are formed on the first plating layers 111. More specifically, each of the external terminal electrodes 108 and 109 is made of a three-layer structure including the paste electrode layer 110, the first plating layer 111, and the second plating layer 112.

The external terminal electrodes 108 and 109 are required to provide favorable solderability when the laminated electronic component 101 is mounted on a substrate using solder. At the same time, the external terminal electrode 108 is required to electrically connect the plurality of internal electrodes 103 to each other, which are electrically insulated from each other, and the external terminal electrode 109 is required to electrically connect the plurality of internal electrodes 104 to each other, which are electrically insulated from each other. The second plating layer 112 described above ensures solderability, and the paste electrode layer 110 electrically connects the internal electrodes 103 and 104 to each other. The first plating layer 111 prevents solder leach at the solder joint.

However, each of the paste electrode layers 110 has an increased thickness of several tens μm to several hundreds of μm. Therefore, in order to achieve the dimensions of the laminated electronic component 101 within certain specifications, there is an undesirable need to reduce the effective volume for providing the capacitance, because there is a need to provide a certain volume of the paste electrode layers 110. On the other hand, each of the plating layers 111 and 112 has a thickness on the order of several μm. Thus, if the external terminal electrodes 108 and 109 can be made of only the first plating layer 111 and the second plating layer 112, the effective volume for providing the capacitance can be significantly increased.

For example, Japanese Patent Application Laid-Open No. 63-169014 discloses a method of forming an external terminal electrode by depositing a conductive metal film via electroless plating onto the entire sidewall surface of a laminate at which internal electrodes are exposed, so as to short-circuit the internal electrodes exposed at the sidewall surface.

However, when a conductive metal film defining an external terminal electrode is formed by electroless plating, the film has small crystal grain sizes of metal grains, and has a surface that is susceptible to oxidation. Therefore, in the case of forming a first plating layer by electroless plating with the use of a metal, for example, including copper as its main constituent, and then forming a second plating layer thereon including nickel as its main constituent, peeling is likely to occur between the first plating layer and the second plating layer. In addition, electroless plating has a relatively low deposition rate, which prevents an increase in productivity.

On the other hand, in order to solve the problems of the electroless plating described above, it is conceivable to apply electrolytic plating, although not described in Japanese Patent Application Laid-Open No. 63-169014. However, with electrolytic plating, the degree of plating growth (the throwing power of the plated deposition) is inferior as compared to electroless plating. Thus, there is a possibility that the increased distance between adjacent exposed ends of the internal electrodes may produce insufficient plating growth, and thus produce a portion which is not plated.

SUMMARY OF THE INVENTION

Preferred embodiments of the present invention provide a laminated electronic component which solves the problems described above.

A preferred embodiment of the present invention is directed to a laminated electronic component which preferably includes a laminate including a plurality of stacked insulator layers and internal electrodes provided along the interfaces between the insulator layers, the internal electrodes including ends exposed at a predetermined surface, and an external terminal electrode provided on the predetermined surface of the laminate and electrically connected to the internal electrodes, in which the external terminal electrode preferably includes a plating film provided directly on the predetermined surface of the laminate, and in order to solve the problems described above, the laminated electronic component preferably includes the following configurations.

First, the plating film preferably has a stack structure including a plurality of layers including a specific metal as a main constituent, and preferably has a total thickness of about 3 μm to about 15 μm, for example. More specifically, the plating film including a specific metal as a main constituent includes a plurality of stacked layers. It is to be noted that second and subsequent plating layers including a different metal from the specific metal as their main constituent may preferably be provided on the plating film.

The ratio of the total thickness of second and subsequent layers provided on a first layer to the thickness of the first layer in direct contact with the predetermined surface of the laminate is preferably about 2 to about 10, for example. That is, the total thickness of the second and subsequent layers is about two or more times as large as the thickness of the first layer.

According to a preferred embodiment of the present invention, for the plating film provided directly on the predetermined surface of the laminate, the total thickness of the second and subsequent layers is preferably increased while the thickness of the first layer is decreased. Thus, the grain size of a metal grain included in the uppermost layer of the plating film can be increased. For example, the grain size of a metal grain can preferably be set to about 0.5 μm or more, for example. Therefore, this increased grain size enables the outward surface of the plating film provided directly on the predetermined surface of the laminate to be made less susceptible to oxidation.

Therefore, when this plating film defines a first plating film, the adhesion force of a second plating film to the first plating film is increased when forming second and subsequent plating films including a different metal from the specific metal as their main constituent on the first plating film.

When the first layer is formed by electroless plating, whereas the second and subsequent layers are formed by electrolytic plating, the electrical bonding force can be increased between the plating film provided directly on the predetermined surface of the laminate and the internal electrode, in addition, the fixing strength of the plating film provided directly on the predetermined surface of the laminate to the laminate can be further increased, and even when this plating film has an increased thickness, a favorably dense film can be obtained. Furthermore, the productivity is increased for the formation of the external terminal electrode, and as described above, the plating film facilitates an increase in the grain size of a metal grain included in the uppermost layer of the plating film.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
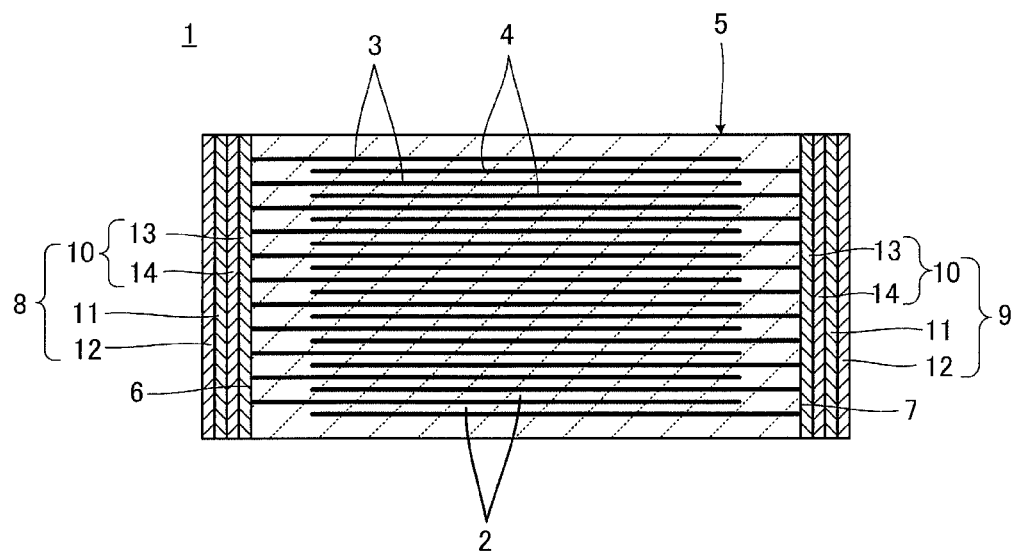
FIG. 1 is a cross-sectional view illustrating a laminated electronic component according to a preferred embodiment of the present invention.
Figure 2:
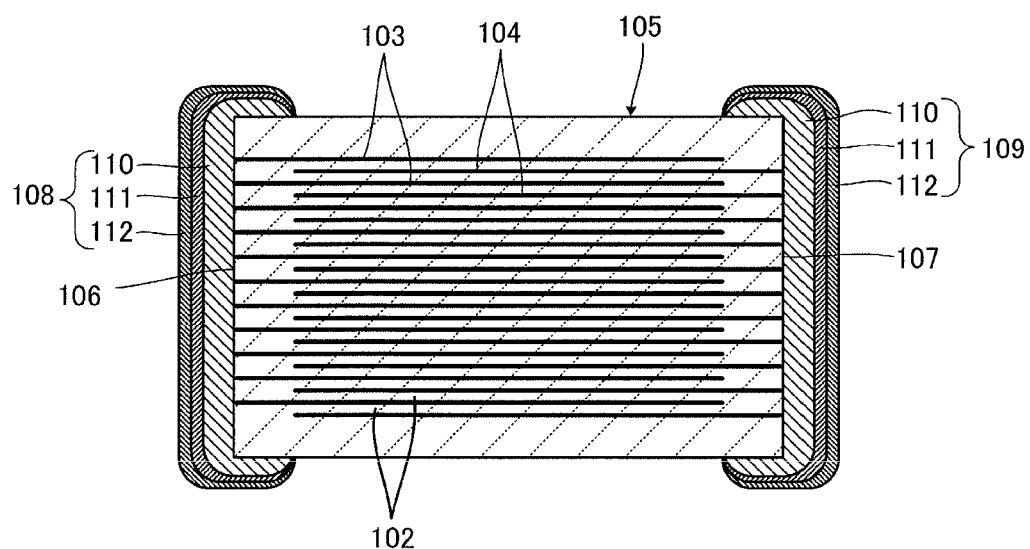
FIG. 2 is a cross-sectional view of a conventional laminated electronic component.

A laminated electronic component 1 according to preferred embodiments of the present invention will be described with reference to FIG. 1.

The laminated electronic component 1 preferably includes a laminate 5 including a plurality of stacked insulator layers 2 and a plurality of layered internal electrodes 3 and 4 arranged along the interfaces between the insulator layers 2.

When the laminated electronic component 1 defines a laminated ceramic capacitor, the insulator layers 2 are preferably made of a dielectric ceramic. It is to be noted that the laminated electronic component 1 may define other components such as an inductor, a thermistor, and a piezoelectric component, for example. Therefore, depending on the function of the laminated electronic component 1, the insulator layers 2 may preferably be made of a magnetic ceramic, a semiconductor ceramic, a piezoelectric ceramic, or other suitable ceramic, in addition to a dielectric ceramic, or may preferably be made of a material including a resin, for example. The internal electrodes 3 and 4 preferably include, for example, nickel as a main constituent.

The ends of the plurality of internal electrodes 3 and the ends of the plurality of internal electrodes 4 are respectively exposed at the end surfaces 6 and 7 of the laminate 5, and external terminal electrodes 8 and 9 are respectively provided so that the respective ends of the internal electrodes 3 and the respective ends of the internal electrodes 4 are electrically connected to each other.

It is to be noted that while the laminated electronic component 1 illustrated is a two-terminal type component including the two external terminal electrodes 8 and 9, preferred embodiments of the present invention can also be applied to multi-terminal type laminated electronic components.

Each of the external terminal electrodes 8 and 9 preferably includes a first plating layer 10 formed by plating directly on the exposed surfaces of the internal electrodes 3 and 4, that is, the end surfaces 6 and 7 of the laminate 5, a second plating film 11 formed thereon, and a third plating layer 12 further formed thereon, respectively.

The first plating films 10 are provided to electrically connect the plurality of internal electrodes 3 and the plurality of internal electrodes 4 to each other, and preferably for example, include copper as a main constituent. Copper is preferable in that it provides plated depositions with favorable throwing power and, thus, can increase the efficiency of the plating process and increase the fixing strength of the external terminal electrodes 8 and 9. Next, the second plating films 11 preferably include, for example, nickel as a main constituent, and function as solder barrier layers. The third plating films are intended to provide solderability, which preferably include, for example, tin or gold as a main constituent.

The first plating film 10 described above preferably has a stack structure including, for example, first and second layers 13 and 14 both including copper as a main constituent, and preferably has a total thickness of about 3 μm to about 15 μm, for example. In addition, the ratio of the thickness of the second layer 14 to the thickness of the first layer 13 is preferably set to about 2 to about 10, for example.

It is to be noted that third and subsequent layers including copper as a main constituent may be provided on the second layer 14. In this case, the ratio of the total thickness of the second and subsequent layers 14 to the thickness of the first layer 13 is preferably set to about 2 to about 10, for example.

Next, a method for manufacturing the laminated electronic component 1 shown in FIG. 1, and in particular, a method for forming the external terminal electrodes 8 and 9 according to a preferred embodiment of the present invention will be described.

First, the laminate 5 is preferably manufactured in accordance with a known method. Next, the external terminal electrodes 8 and 9 are formed respectively on the end surfaces 6 and 7 of the laminate 5 so as to be electrically connected to the internal electrodes 3 and 4.

For the formation of the external terminal electrodes 8 and 9, the first layers 13 defining bases for the first plating layers 10 are preferably formed on the end surfaces 6 and 7 of the laminate 5. In the laminate 5 before the plating, the plurality of internal electrodes 3 exposed at the one end surface 6 are electrically insulated from each other, and the plurality of internal electrodes 4 exposed at the other end surface 7 are electrically insulated from each other. For the formation of the first layers 13, metal ions in a plating solution are deposited on the respective exposed sections of the respective internal electrodes 3 and 4. Then, the plated deposits are further grown to physically connect the plated deposits on the respective exposed sections of the adjacent internal electrodes 3 and the plated deposits on the respective exposed sections of the adjacent internal electrodes 4. In this manner, the first layers 13 are preferably formed so as to be homogeneous and dense.

The first layers 13 described above preferably include, for example, copper as a main constituent, and are preferably formed by electroless plating.

Before the plating step described above for the first layers 13, the end surfaces 6 and 7 of the laminate 5 are preferably subjected to a polishing process in order to sufficiently expose the internal electrodes 3 and 4 at the end surfaces 6 and 7. In this case, when the end surfaces 6 and 7 are subjected to the polishing process to such an extent that the respective exposed ends of the internal electrodes 3 and 4 project from the end surfaces 6 and 7, the respective exposed ends are extended in a planar direction, and the energy required for plating growth can be reduced.

Next, the second layer 14 defining the upper layer of the first plating film 10 is formed on the first layer 13. The second layer 14 preferably includes, for example, copper as its main constituent, as in the first layer 13. The second layer 14 is preferably formed by electrolytic plating. It is to be noted that the location to be plated has a continuous conductive surface when forming the second layer 14 after the first layer 13 has been formed, and thus, the second layer 14 can be effectively and efficiently formed by applying electrolytic plating.

As described above, the first electroless plating layer and the second electrolytic plating layer 14 are likely to cause diffusion from the first layer 13 to the internal electrodes 3 and 4, for example, when a thermal shock is applied in the vicinity of a solder reflow temperature. In this case, the second electrolytic plating layer 14 effectively prevents excessive diffusion of the first layer 13 into the internal electrodes 3 and 4 when a heat shock is applied. More specifically, the first layer 13 and the second layer 14 formed by a combination of electroless plating/electrolytic plating can effectively control a diffusion phenomenon while promoting the diffusion phenomenon caused by a heat shock during reflow. As a result, the electrical bonding force is significantly improved between the internal electrodes 3 and 4 and the first plating film 10.

In addition, the first electroless plating layer 13 and the second electrolytic plating layer 14 can further improve the fixing force of the first plating film 10 to the laminate 5, and provide a favorably dense film even when the first plating film 10 has an increased thickness.

In the formation of the first plating film 10, the first layer 13 is preferably formed to have a relatively small thickness form, whereas the second layer 14 is preferably formed to have a relatively large thickness. More specifically, the thickness of the second layer 14 is preferably set to, for example, about 2 to about 10 times the thickness of the first layer 13. In addition, the total thickness of the first plating film 10 is preferably about 3 μm to about 15 μm, for example.

As described above, the increased thickness of the second layer 14 can preferably increase the grain sizes of the metal grains included in the second layer 14 to, for example, about 0.5 μm or more. This increase means that the outward surface of the first plating film 10 is less likely to be oxidized. Therefore, the bonding property is improved between the first plating film 10 and the second plating film 11 which is subsequently formed.

Next, the second plating film 11 preferably is formed on the first plating film 10. The second plating film 11 functions as a solder barrier layer preferably made of, for example, nickel, which is preferably formed by electrolytic plating.

Next, the third plating film 12 is preferably formed on the second plating film 11. The third plating film 12 functions as a solderability providing layer preferably made of, for example, tin or gold, which is preferably formed by electrolytic plating.

The laminated electronic component 2 shown in FIG. 1 is preferably produced by the method described above.

An experimental example will be described below, which was performed in order to determine the scope of the present invention and confirm the advantageous effects of preferred embodiments of the present invention.

As laminates of laminated electronic components for samples, a laminate for a laminated ceramic capacitor with a length of about 0.94 mm, a width of about 0.47 mm, and a height of about 0.47 mm was prepared which included insulator layers including a barium titanate based dielectric ceramic and internal electrodes including nickel as a main constituent. In the laminates, the number of ceramic layers stacked was 220, and the ceramic layers each had a thickness of about 1.5 μm. In addition, the laminated ceramic capacitor as a finished product was designed to provide a capacitance of about 2.2 μF and a rated voltage of about 6.3 V.

Next, 500 of the laminates were placed into a 300-milliliter horizontal rotating barrel, and in addition, about 100 milliliters of steel conductive media having a diameter of about 0.7 mm was placed into the horizontal rotating barrel.

Then, in order to form the first layer in the first plating film, an electroless copper plating bath at a bath temperature of about 40° C. was prepared, which included:

Copper sulfate pentahydrate: about 10 g/liter;
Formaldehyde: about 4 g/liter;
Potassium sodium tartrate tetrahydrate: about 30 g/liter;
Polyethylene glycol: about 1 g/liter; and
Sodium hydroxide: about 5 g/liter.

The rotating barrel was immersed in the electroless copper plating bath, and rotated at a barrel peripheral speed of about 2.6 m/min while performing aeration at about 0.5 liter/min, to perform electroless copper plating for such a period of time that achieved the thickness shown in the "First Layer" in the column "Thickness of First Plating Film" of Table 1.

Then, in order to form the second layer of the first plating film, an electrolytic copper plating bath "Pyrobright Process" (including no brightening agent) from C. Uyemura & Co., Ltd. was prepared at a bath temperature of about 55° C. and pH of about 8.6, the barrel described above was immersed in the electrolytic copper plating bath, and an electric current was applied at a current density of about 0.30 A/dm$^2$ while rotating the barrel at a barrel peripheral speed of about 2.6 m/min, to perform electrolytic copper plating for such a period of time that achieved the thickness shown in the "Second Layer" in the column "Thickness of First Plating Film" of Table 1.

Next, in order to form the second plating film, a Watt bath (weak acid nickel bath) was prepared at a bath temperature of about 60° C. and pH about 4.2, the barrel described above was immersed in the Watt bath, and an electric current was applied at a current density of about 0.20 A/dm$^2$ for about 60 minutes while rotating the barrel at a barrel peripheral speed of about 2.6 m/min, to form a second plating film defined by an electrolytic nickel plating film with a thickness of about 4 μm.

Next, in order to form the third plating film, an electrolytic tin plating bath "NB-RZS" from Ishihara Chemical Co., Ltd. was prepared at a bath temperature of about 30° C. and pH about 4.5, the barrel described above was immersed in the electrolytic tin plating bath, and an electric current was applied at a current density of about 0.10 A/dm$^2$ for about 60 minutes while rotating the barrel at a peripheral speed of about 2.6 m/min, to form a third plating film defined by an electrolytic tin plating film with a thickness of about 4 μm.

Thereafter, the laminates were removed from the barrel, and dried at about 60° C. for about 10 minutes to obtain laminated ceramic capacitors.

The laminated ceramic capacitors obtained in the manner described above as finished products according to the samples or interim products in the process of being manufactured were evaluated as follows.

(1) Evaluation for Continuity of First Plating Film

The interim products before the formation of the second plating film (nickel plating film) were evaluated for the continuity of the first plating film (copper plating film) through observations using an optical microscope. If 5% or more of the end surface of the laminate was exposed, on which the first plating film defining an external terminal electrode should have been formed, the sample was determined to be defective, and if at least one defective sample was found among 100 samples for each sample number, the term "NG" was provided in the column "Continuity of Film" of Table 1, or if not, the term "G" was provided in the column.

(2) Evaluation for Bonding Property Between First Plating Film and Second Plating Film The bonding property was evaluated by applying a load that causes a shear fracture to the finished laminated ceramic capacitors. More specifically, the laminated ceramic capacitors according to each sample were mounted on substrates by soldering, a load was applied in parallel or substantially in parallel to the both external terminal electrodes at a loading speed of about 0.5 mm/sec until a fracture was produced, and the fracture mode (fracture point) was observed when a fracture was produced. If peeling was caused at the interface between the first plating film (copper plating film) and the second plating film (nickel plating film), the sample was determined to be defective, and if at least one defective sample was found among 100 samples for each sample number, the term "NG" was provided in the column "Bonding Property to Ni Plating" of Table 1, or if not, the term "G" was provided in the column.

(3) Evaluation for Swelling of First Plating Film

The interim products before the formation of the second plating film (nickel plating film) were evaluated for plating swelling of the first plating film (copper plating film) through observations using an optical microscope. If the first plating film was found to have plating swelling of about 10 μm or more in diameter, the sample was determined to be defective, and if at least one defective sample was found among 100 samples for each sample number, the term "NG" was provided in the column "Plating Swelling" of Table 1, or if not, the term "G" was provided in the column.

TABLE 1

| Sample Number | Thickness of First Plating Film [μm] First Layer | Thickness of First Plating Film [μm] Second Layer | Thickness of First Plating Film [μm] Total | Ratio of Second Layer/ First Layer | Continuity of Film | Bonding Property to Ni Plating | Plating Swelling |
|---|---|---|---|---|---|---|---|
| 1 | 1 | 1.5 | 2.5 | 1.5 | G | NG | G |
| 2 | 1 | 2 | 3 | 2 | G | G | G |
| 3 | 1 | 10 | 11 | 10 | G | G | G |
| 4 | 1 | 11 | 12 | 11 | G | G | NG |
| 5 | 2 | 3 | 5 | 1.5 | G | NG | G |
| 6 | 2 | 4 | 6 | 2 | G | G | G |
| 7 | 2 | 12 | 14 | 6 | G | G | G |
| 8 | 2 | 20 | 22 | 10 | G | G | NG |
| 9 | 3 | 4.5 | 7.5 | 1.5 | G | NG | G |
| 10 | 3 | 6 | 9 | 2 | G | G | G |
| 11 | 3 | 12 | 15 | 4 | G | G | G |
| 12 | 3 | 15 | 18 | 5 | G | G | NG |

Referring to Table 1, in the samples 2, 3, 6, 7, 10, and 11, the total thickness of the first plating film falls within the range of about 3 μm to about 15 μm, and the thickness ratio of the second layer/the first layer falls within the range of about 2 to about 10. Therefore, it was determined that the samples 2, 3, 6, 7, 10, and 11 produced excellent results in terms of all of the continuity of the film, the bonding property to the Ni plating, and the plating swelling.

In contrast to these samples, the thickness ratio of the second layer/the first layer is less than about 2 in the samples 1, 5, and 9. Therefore, it was determined that the samples 1, 5, and 9 had peeling caused between the first plating layer and the second plating layer, and thus resulting in "NG" in terms of the bonding property to the Ni plating. The examination of these samples for the grain sizes of metal grains in the second layer provided a result of less than about 0.5 μm, and it was determined that oxidation was promoted.

In the sample 4, the thickness ratio of the second layer/the first layer is greater than about 10. Therefore, the influence of film stress (compressive stress) of the second layer was increased which causes plating swelling.

In the samples 8 and 12, the total thickness of the first plating film is greater than about 15 μm. Therefore, the influence of film stress of the first plating film was increased which caused plating swelling.

It is to be noted that all of the samples 1 to 12 produced the result of "G" in terms of the continuity of the film. This is presumed to be because the formation of the first layer by electroless plating increased the degree of plating growth (the throwing power of the plating deposit).

It is to be noted that while copper was used as the metal defining the first plating layers in the experimental example described above, it has been confirmed that similar results are obtained even when metals including copper as their main constituent and including other constituents are used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated electronic component comprising:
    a laminate including a plurality of stacked insulator layers and internal electrodes arranged along interfaces between the insulator layers, the internal electrodes including exposed ends at a predetermined surface of the laminate; and
    an external terminal electrode provided on the predetermined surface of the laminate, and electrically connected to the internal electrodes; wherein
    the external terminal electrode includes a plating film disposed directly on the predetermined surface of the laminate;
    the plating film includes a plurality of layers including a specific metal as a main constituent, and has a total thickness of about 3 μm to about 15 μm; and
    a ratio of a total thickness of a second layer and subsequent layer of the plurality of layers provided on a first layer of the plurality of layers to a thickness of the first layer in direct contact with the predetermined surface of the laminate is about 2 to about 10.

2. The laminated electronic component according to claim 1, wherein the first layer is an electrolessly plated layer, and the second and subsequent layers are electrolytically plated layers.

3. The laminated electronic component according to claim 1, wherein metal grains included in an uppermost layer of the plurality of layers have a grain size of about 0.5 μm or more.

* * * * *